United States Patent
Burts, Jr.

(10) Patent No.: US 6,323,158 B1
(45) Date of Patent: *Nov. 27, 2001

(54) WELL FLUID ADDITIVE, WELL FLUID MADE THEREFROM, METHOD OF TREATING A WELL FLUID, METHOD OF CIRCULATING A WELL FLUID

(75) Inventor: Boyce D. Burts, Jr., Lafayette, LA (US)

(73) Assignee: Bottom Line Industries, Inc., Lafayette, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/093,097

(22) Filed: Jun. 8, 1998

Related U.S. Application Data

(63) Continuation of application No. 08/756,388, filed on Nov. 26, 1996, now Pat. No. 5,763,367, which is a continuation-in-part of application No. 08/289,774, filed on Aug. 12, 1994, now Pat. No. 5,599,776, which is a continuation of application No. 07/831,045, filed on May 26, 1992, now abandoned, which is a division of application No. 07/676,944, filed on Mar. 28, 1991, now Pat. No. 5,118,664.

(51) Int. Cl.$^7$ .................................................. C09K 7/00
(52) U.S. Cl. ................................................ 507/104; 175/72
(58) Field of Search .............................. 507/104; 175/72

(56) References Cited

U.S. PATENT DOCUMENTS

| | | | | |
|---|---|---|---|---|
| 2,779,417 | * | 1/1957 | Clark et al. | 507/104 |
| 5,004,553 | * | 4/1991 | House et al. | 507/104 |
| 5,076,944 | * | 12/1991 | Cowan et al. | 507/104 |
| 5,118,664 | * | 6/1992 | Burts, Jr. | 507/104 |
| 5,599,776 | * | 2/1997 | Burts, Jr. | 507/104 |
| 5,763,367 | * | 6/1998 | Burts, Jr. | 507/104 |

OTHER PUBLICATIONS

Kirk–Othmer, Encyclopedia of Chemical Technology, vol. 7, $2^{nd}$ Edition, pp. 297–299, (1965).*

* cited by examiner

*Primary Examiner*—Philip Tucker
(74) *Attorney, Agent, or Firm*—Gilbreth & Associates, P.C.; J. M. Gilbreth; Mary A. Gilbreth

(57) ABSTRACT

An drilling fluid additive to reduce loss circulation includes comminuted rice fraction and corn cobs, and includes ground at least one of ground wood fiber, ground nut shells, ground paper and shredded cellophane. A method of treating a drilling fluid includes contacting such drilling fluid additive with the base drilling fluid to form well fluid. A method of operating a well includes circulation of such a well fluid into and out of a borehole.

9 Claims, No Drawings

WELL FLUID ADDITIVE, WELL FLUID MADE THEREFROM, METHOD OF TREATING A WELL FLUID, METHOD OF CIRCULATING A WELL FLUID

RELATED APPLICATION DATA

This application is a Continuation of U.S. patent application Ser. No. 08/756,388 filed Nov. 26, 1996 now 5,763,367, which is a continuation-in-part U.S. patent application Serial No. 08/289,774, filed Aug. 12, 1994, now issued as U.S. Pat. No. 5,599,776, which is a continuation of U.S. patent application Ser. No. 07/831,045, filed May 26, 1992, now abandoned, which is a divisional of U.S. patent application Ser. No. 07/676,944, filed Mar. 28, 1991, now issued as U.S. Pat. No. 5,118,664.

BACKGROUND OF THE INVENTION

1. Field of the Invention

The present invention relates to well fluid additives, to well fluids made therefrom, to methods of treating a well fluid, and to methods of circulating a well fluid in a well. In another aspect, the present invention relates to loss circulation well fluid additives, to well fluids made therefrom, to methods of treating a well for loss circulation, and to methods of circulating loss circulation additives in a well. In even another aspect, the present invention relates to well fluid additives comprising rice hulls and corn cobs with one or more of cedar fiber, nut shells, paper and cellophane, to well fluids comprising rice hulls and corn cobs with one or more of cedar fiber, nut shells, paper and cellophane, to methods of treating well fluids by addition of rice hulls and corn cobs with one or more of cedar fiber, nut shells, paper and cellophane, and to methods of circulating such well fluid in a well.

2. Description of the Related Art

Subterranean wells are utilized to reach desirable oil and/or gas bearing formations, and are generally drilled utilizing rotary drilling techniques. In such rotary drilling of wells for oil and gas, drilling fluids ("muds") are circulated into the well through hollow tubular drill pipe, past the teeth of the cutter head to sweep away the cuttings from the cutter head, and returned to the surface along with the cuttings through the annulus surrounding the drill pipe. The drilling fluid is generally circulated in such a manner as to remove drill cuttings to prevent clogging of the cutter and to support the walls of the well hole. Such drill cuttings are entrained in the drilling fluid and brought to the surface with the fluid and then screened out and discarded. In addition to removing drill cuttings and supporting the walls of the well hole, the drilling fluid also serves to cool and lubricate the drill bit and, in the case of systems employing downhole drill motors, it functions as a power fluid for the drill motor.

Typically, drilling fluids may be water-base, employing a base of fresh water, salt water, or an oil-in-water emulsion in which water forms the continuous phase, or oil-base, employing a relatively pure oil such as crude petroleum oil or diesel oil, or in may be an "invert" emulsion, a water-in-oil emulsion in which oil forms the continuous phase or a synthetic base employing a polymer.

Drilling fluids normally contain clays and/or other dispersed solids which are employed to impart desired rheological properties to the drilling fluid. Not only do these clays and/or other suspended solids impart desirable thixotropic properties to the drilling fluid, they also serve to coat the walls of the well with a relatively impermeable sheath, commonly termed a filter cake, which retards the flow of fluid from the well into the surrounding subterranean formations.

In addition to clays and/or other suspended particles, a drilling fluid may also contain one or more weighting agents which function to increase the density of the fluid to a level which will offset high pressures encountered during the drilling operation. Non-limiting examples of suitable weighting agents which may be used in either water base or oil base drilling fluids include heavy minerals such as barite and gelena.

One problem very commonly encountered during rotary drilling operatings is the problem of lost circulation in which part or all of the drilling fluid is not returned to the surface. This problem may manifest itself anywhere from moderate losses of the drilling fluid, to substantial or even total losses of the drilling fluid such that little or none of it is returned to the surface. Where a formation zone is identified in which unacceptablly large amounts of drilling fluid is lost, such formation zone is commonly termed a "loss zone" or a loss circulation zone." While there are many causes for loss circulation, non-limiting examples include those situations when the well encounters a formation of unusually high permeability or one which has naturally occurring horizontal or verticle fractures or fissures. Also, the formation may be fractured accidentally by the hydrostatic pressure exerted by the drilling mud, particularly when a change over to a relatively heavy mud is made in order to control high formation pressures.

As can be expected, over the years numerous techniques have been developed to prevent or reduce loss circulation. One common technique where the loss circulation is not so severe is to add various fluid loss agents which function to change the Theological properties of the drilling mud in order to increase its resistance to flow from the well bore into the formation. Such fluid loss agents include synthetic polymeric thickening agents such as partially hydrolyzed polyacrylamide, polyelectrolite such as an ionic polysaccharide, various gums such as locust bean gum and guar gum, various starches, and carboxymethylcellulose (CMC) or carboxyethylcellulose (CEC).

Where the loss circulation is more severe, it is a normal practice to incorporate into the drilling mud various bulk materials which function to combat or prevent loss circulation. It has been common in the past to add any number of materials to the drilling fluid which act to reduce or prevent flow of the drilling fluid from the well hole to the formation. These materials are commonly referred to as "loss (or lost) circulation additives". Such prior art loss circulation materials include fibrous, flake (or laminated), and granular materials. A nonexhaustive list of such loss circulation includes nut and seed shells or hulls (peanut almond, walnut, peach, brazil, coconut, peanut, sunflower, flax, cocoa bean, cottonseed, rice, linseed); crude pectate pulp; feathers; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbonhydrates such as citrus pulp, oatmeal, tapioca, rice grains, potatoes, carrots, beets, and various grain sorghams); the ground woody ring portion of corn cobs; whole ground corn cobs; hydrophobic, organophilic, water-wettable fibrous materials such as treated coton, dried bagasse, and dried peat fibers; and specific mixtures of these materials. Many assorted inorganic materials have also been utilized as loss circulation materials.

Seepage losses can occur to any type of loss zone and in any type of formation when the particles in the drilling fluid are not fine enough to complete the seal. It has been established that the maximum allowable drilling fluid loss is on the order of 1 bbl/hr (0.16 m$^3$/h), as measured in the mud pit at the surface.

There are numerous examples of patents teaching the use of various types of materials for use as lost circulation additives in drill fluids. The following are not an exhaustive sampling.

U.S. Pat. No. 2,610,149, issued Sep. 9, 1952, to Van Dyke, discloses the use of corn stalks, wood shavings, flake cellophane and chopped up paper in drilling fluids.

U.S. Pat. No. 2,779,417, issued Jan. 29, 1957, to Clark et al., discloses the use of cellophane, rice hulls and shredded paper as bridging agents in a well fluid.

U.S. Pat. No. 4,247,403, issued Jan. 27, 1981, to Foley et al., discloses the use of whole corncobs or the woody ring portion of corncobs as loss circulation additives for drilling fluids.

U.S. Pat. No. 4,474,665, issued Oct. 2, 1984 to Green, discloses a lost circulation material useful in drilling fluids formed from cocoa bean shell material having a particle size distribution from 2 to 100 mesh. U.S. Pat. No. 4,579,668, issued Apr. 1, 1986 to Messenger, discloses for use as drilling fluid bridging agents, ground walnut shells, cellophane and shredded wood.

U.S. Pat. No. 5,004,553, issued Apr. 2, 1991, and U.S. Pat. No. 5,071,575, issued Dec. 10, 1991, both to House et al., disclose a well working composition containing oat hulls and optionally including one or more of ground corn cobs, cotton, citrus pulp, and ground cotton burrs.

U.S. Pat. No. 5,076,944, issued Dec. 31, 1991 to Cowan et al., discloses a seepage loss additive comprising ground cotton burrs in combination with one or more of ground oat hulls, ground corn cobs, cotton, ground citrus pulp, ground peanut shells, ground rice hulls, and ground nut shells.

However, in spite of these advancements in the prior art, there still need for further innovation in the drilling, well fluid and well fluid additive arts.

Thus, these is still a need for another well fluid additive.

There is another need in the art for another well fluid comprising a drilling fluid and a well fluid additive.

There is even another need in the art for another method of treating a well fluid by addition of a well fluid additive to the well fluid.

There is still another need in the art for another method of circulating a well fluid.

These and other needs in the art will become apparent to those of skill in the art upon review of this specification, including its drawings and claims.

SUMMARY OF THE INVENTION

It is an object of the present invention to provide for further innovation in the drilling, well fluid and well fluid additive arts.

It is another object of the present invention to provide for another well fluid additive.

It is even another object of the present invention to provide for another well fluid comprising a drilling fluid and a well fluid additive.

It is still another object of the present invention to provide for another method of treating a well fluid by addition of a well fluid additive to the fluid.

It is even another object of the present invention to provide for another method of circulating a well fluid These and other objects of the present invention will become apparent to those of skill in the art upon review of this specification, including its drawings and claims.

According to one embodiment of the present invention there is provided a well fluid additive. The present well fluid additive includes comminuted pith or chaff portions of corn cobs, a communited rice fraction, and at least one of ground wood fiber, ground nut shells, ground paper or shredded cellophane.

According to another embodiment of the present invention, there is provided a well fluid. The present well fluid includes an oil base or water base drilling fluid. The well fluid further includes an additive, which generally includes comminuted pith or chaff portions of corn cobs, a communited rice fraction, and at least one of ground wood fiber, ground nut shells, ground paper or shredded cellophane.

According to even another embodiment of the present invention, there is provided method of making a well fluid comprising contacting a drilling fluid with an additive. The additive will generally include comminuted pith or chaff portions of corn cobs, a communited rice fraction, and at least one of ground wood fiber, ground nut shells, ground paper or shredded cellophane.

According to still another embodiment of the present invention, there is provided a method of carrying out drilling operations in a borehole extending into a subterranean formation. The present invention generally includes comprising circulating a well fluid into and out of the borehole. The well fluid utilized in the drilling operation generally includes a drilling fluid and an additive, with the additive including comminuted pith or chaff portions of corn cobs, a communited rice fraction, and at least one of ground wood fiber, ground nut shells, ground paper and shredded cellophane.

DETAILED DESCRIPTION OF THE INVENTION

The drilling fluid additive of the present invention comprises a rice fraction, which is commercially available in the form of rice hulls, rice tips, rice straw and rice bran. These different parts of the rice plant are separated commercially and are widely available from rice mills. The rice fraction is a common by-product when finished rice is brought to market. Each of these products can be comminuted to very fine particle sizes by drying the products and using hammer mills, cutter heads, air control mills or other comminution methods. Air classification equipment or other means can be used for separation of desired ranges of particle sizes using techniques well-known in industry.

The size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

The drilling fluid of the present invention comprises another material derived from plants and available in industry, corn cobs, which is the material supporting the kernals of corn, the kernals being the principal product of the corn plant. After the corn kernals are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for ancoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions("BPC") are the preferred portions of the corn cob, with the chaff portions being more preferred.

The dry bees wings, pith and chaff portions can be ground using air control mills, hammer mills, cutter heads or other comminution methods well known in industry. A range of particle sizes of pith and chaff can be obtained, but the size range smaller than about 8 mesh is suitable for this invention. Preferably, a particle size distribution ranging from smaller than 8 mesh to smaller than 100 mesh is utilized.

In addition to the rice fraction and corn cob portions, the drilling fluid additive of the present invention also includes at least one other material selected from the group consisting of ground wood fiber, ground nut shells, ground paper, and shredded cellophane. Preferably, the present drilling fluid additive comprises rice fraction, corn cob, and wood fiber. More preferably, the present drilling fluid additive comprises rice fraction, corn cob, wood fiber, nut shells, paper, and cellophane.

Suitable wood fibers include any type of hard wood fiber, including cedar fiber, oak fiber, pecan fiber and elm fiber. Preferably the wood fiber comprises cedar fibers. Suitable nut shells include pecan, walnut, and almond. Preferably, the nut shells comprise at least one of pecan or walnut shells.

Suitable particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh. A specific non-limiting example of a suitable particle size distribution is provided in the Example below.

In the practice of the present invention, any suitable percentage of the various materials may be utilized. Generally, the present invention fluid additive will comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the additive). Preferably, the present invention fluid additive will comprise in the range of about 20 to about 75 weight percent rice, in the range of about 5 to about 35 weight percent corncob pith or chaff, with the total of ground wood fiber, ground nut shells, ground paper and shredded cellophane comprising in the range of about 20 to about 75 weight percent. More preferably, the present invention fluid additive will comprise in the range of about 30 to about 50 weight percent rice, in the range of about 10 to about 30 weight percent corncob pith and chaff, with the total of ground wood fiber, ground nut shells, ground paper and shredded cellophane comprising in the range of about 25 to about 50 weight percent (weight percent based on the total weight of plant material in the additive).

Excluding the weight of rice and corn cobs, the well fluid will generally comprise in the range of about 0 to about 100 weight percent ground wood fiber, in the range of about 0 to about 100 weight percent ground nut shells, in the range of about 0 to about 100 weight percent ground paper, in the range of about 0 to about 100 weight percent shredded cellophane. Preferably, excluding the weight of rice and corn cobs, the well fluid will generally comprise in the range of about 0 to about 65 weight percent ground wood fiber, in the range of about 0 to about 65 weight percent ground nut shells, in the range of about 0 to about 30 weight percent ground paper, in the range of about 0 to about 30 weight percent shredded cellophane. More preferably, excluding the weight of rice and corn cobs, the well fluid will generally comprise in the range of about 30 to about 50 weight percent ground wood fiber, in the range of about 30 to about 50 weight percent ground nut shells, in the range of about 5 to about 15 weight percent ground paper, in the range of about 5 to about 15 weight percent shredded cellophane.

In addition to the above mentioned materials, the present drilling fluid additive may also include many other materials derived from natural plants which are available, some as by-products and some as principal products of those plants. These include the following materials: peanut hulls, cotton seed hulls, cotton seed stems, flax seed, flax stems, wheat hulls, wheat tips, wheat stems, wheat bran, coconut hulls, oat hulls, sunflower seed stems, soybean hulls, soybean stems, maize, maize stems, rye grass seed, rye grass stems, millet seed, millet stems, and barley, as well as any other material named above in the section entitled Background Of The Invention.

In the practice of the present invention, the comminuted plant materials may be mixed together by any suitable method in any suitable apparatus. As a non-limiting example, the comminuted plant materials are mixed in the desired proportion in a dry solid blender, such as a ribbon blender.

When the materials of this invention are to be added to a water base drilling fluid, a small amount of oil may optionally added to the mixture. This optional oil is preferably added while the plant materials are are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of additive materials, more preferably ranging from about 1 percent to about 2 percent. A non-limiting example of a commercially available oil suitable for use in the present invention includes ISOPAR V, available from Exxon Corporation.

In the practice of the well fluid treating method of the present invention generally includes contacting together a drilling fluid and a drilling fluid additive as described above. Drilling fluid additive may be used in a pill or slug by mixing in a separate tank the additive with a small portion of the drilling fluid to be treated, and then subsequently added to the entire volume of drilling fluid. Alternatively, the additive may be added to the drilling fluid by blending or mixing the additive with the entire volume of drilling fluid used in the well operation. The well fluid additive of the present invention is generally added to the well fluid in the range of about 1 to about 40 pounds per barrel of well fluid, preferably in the range of about 5 to about 35 pounds per barrel.

In the practice of the method of the present invention for operating a well, the well fluid and well fluid additive are circulated into and out of the well hole.

Although carbon particles are not added to drilling fluid additives as a loss circulation material, it is convenient to add carbon particles along with a mixture of loss circulation materials because the carbon particles serve one of the functions of the loss circulation materials, that is, to reduce frictional resistance to movement of the drill pipe. Such carbon particles may be of any suitable size from −20 mesh to −100 mesh, preferably in the range of about −20 mesh to about −85 mesh.

EXAMPLES

This example compares the performance of (1) a base fluid, (2) the base fluid with a cedar fiber of mixture, and (3) the base fluid with a composition of the present invention of ground rice hulls and corncob beeswings, pith and chaff ("BPC"), combined with the cedar fiber mixture.

The cedar fiber mixture is as follows:

| | |
|---|---|
| Ground Cedar Fiber | 40 wt % |
| Ground Nut Shells | 40 wt % |
| Ground Paper | 10 wt % |
| Shredded Cellophane | 10 wt % |

The test composition of the present invention is as follows:

| | |
|---|---|
| The above Cedar Fiber Mixture | 37.5 wt % |
| Ground Rice Hulls −80 mesh | 42.3 wt % |
| BPC −8/+20 mesh | 6.5 wt % |
| BPC −20 mesh | 9.4 wt % |
| BPC −100 mesh | 4.3 wt % |

The materials in the cedar fiber mixture are ground down in a hammer mill or similar type of equipment, with a typical particle size distribution for the finished product generally as follows:

| | |
|---|---|
| +40 mesh | 12.75 wt % |
| +20 mesh | 48.02 wt % |
| +30 mesh | 14.48 wt % |
| +50 mesh | 14.93 wt % |
| +60 mesh | 1.58 wt % |
| +100 mesh | 1.48 wt % |
| −100 mesh | 6.76 wt % |

The ground cedar fiber, paper, and shredded cellophane strips would comprise most of the +10, and +20 portion of the cedar fiber combination product.

The composition of the present invention is made by combining the ground cedar fiber, rice and BPC as described above in a blender and mixing for several minutes to insure the through mixing of all ingredients.

The performance of the base fluid and with additives was evaluated utilizing a Permeability Plugging Tester (PPT) developed by Chevron Research. The instrument is used for making filtration tests on permeable plugging materials without the interference of settling on the filter median. The filter median can be a ¼" thick core, a fused aluminum oxide disc, conventional filter paper, or sintered metal filters. The cell is pressurized with hydraulic oil and can be operated to 2500 psi. The test fluid is separated from the pressuring fluid by a floating piston inside the cell. The results are recorded as volume of fluid collected at certain times during the test. The test begins by heating the test fluid to a predetermined temperature and then applying pressure to the cell. The point which 2500 psi is initially attained is referred to as the "spurt loss" number. The volume of fluid which flowed through the disc is recorded. The test is then continued for 30 minutes while maintaining 2500 psi pressure across the disc. At the end of 30 minutes, the volume of fluid collected is recorded. The is known as the "filtrate" number. The filtrate number is doubled and added to the spurt number. The sum of the two numbers is referred to as the PPT value. The lower the PPT value, the more effective the seal across the disc.

The base fluid for testing is a Wyoming bentonite slurry mixed with tap water at a concentration of 25 ppb (pounds per barrel) and allowed to hydrate for 24 hours. The cedar fiber combination is then mixed in the base fluid at a 40 ppb concentration and placed in the PPT test cell and heated to 200° F. and pressurized to 2500 psi for 30 minutes and the appropriate numbers recorded. The base fluid is then combined with the mixture of cedar fiber, rice and BPC as described above at a concentration of 40 ppb and placed in the PPT test cell and heated to 200° F., pressurized to 2500 psi for 30 minutes and the appropriate numbers recorded. The base fluid is also tested in the PPT tester for comparison purposes.

The results of testing as described above are summarized in the following Table 1. The test median is an aluminum oxide disc ¼" thick having an average pore size of 190 microns.

TABLE 1

| PPT Test Results at 200° F./2500 psi/190 micron | | | |
|---|---|---|---|
| FLUID | SPURT | FILTRATE | PPT |
| Base | NC | NC | 500* |
| Cedar Fiber Mix | 130 | 65 | 260 |
| Invention | 19 | 12.5 | 44 |

*All of the base fluid blew through the disc, no seal established.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A drilling fluid additive suitable for lost circulation control comprising
   (a) a comminuted rice fraction;
   (b) comminuted wood fiber
   (c) ground nut shells;
   (d) ground paper;
   (e) shredded cellophane; and
   (f) ground corncob fraction.

2. The drilling fluid additive of claim 1 wherein the rice fraction comprises from about 40 to about 90 percent by weight of the drilling fluid additive.

3. The drilling fluid additive of claim 1 wherein the rice fraction is selected from the group consisting of rice hulls, rice hull tips, rice straw and rice bran.

4. The drilling fluid additive of claim 1 wherein the rice fraction is comminuted to a size finer than 65 mesh.

5. The drilling fluid additive of claim 1 additionally comprising an effective amount of a material to reduce friction between a borehole and a drill pipe.

6. The drilling fluid additive of claim 1 additionally comprising an effective amount of a polymer to reduce further the rate of fluid loss from the drilling fluid.

7. A method for decreasing fluid loss from a borehole into a subsurface formation comprising:

Mixing a drilling fluid additive with a drilling fluid to form a mixture wherein the drilling fluid additive comprises a comminuted rice fraction, comminuted wood fiber, ground nut shells, ground paper, shredded cellophane and ground corncob fraction; and circulating the mixture through a borehole during operations for the drilling of a well.

8. The method of claim 7 wherein the rice fraction is comminuted to a size finer than 65 mesh.

9. A method for decreasing fluid loss from a borehole into a subsurface formation comprising:

blending lost circulation materials comprising a comminuted rice fraction, comminuted wood fiber, ground nut shells, ground paper, shredded cellophane and ground corncob fraction, the materials comprising from about 50 percent to about 90 percent by weight of a comminuted rice fraction;

mixing the lost circulation materials with a drilling fluid to form a mixture; and circulating the mixture through a borehole during operations for the drilling of a well.

* * * * *